United States Patent
Greiner et al.

(10) Patent No.: US 10,428,184 B2
(45) Date of Patent: Oct. 1, 2019

(54) METHOD FOR PRODUCING A SUPERHYDROPHOBIC MEMBRANE OR SURFACE COATING OF A SUBSTRATE

(71) Applicant: UNIVERSITÄT BAYREUTH, Bayreuth (DE)

(72) Inventors: Andreas Greiner, Bayreuth (DE); Seema Agarwal, Marburg (DE); Mitsunobu Doimoto, Mie (JP)

(73) Assignee: Universitaet Bayreuth, Bayreuth (DE)

( * ) Notice: Subject to any disclaimer, the term of this patent is extended or adjusted under 35 U.S.C. 154(b) by 344 days.

(21) Appl. No.: 15/302,335

(22) PCT Filed: Apr. 9, 2015

(86) PCT No.: PCT/EP2015/057714
§ 371 (c)(1),
(2) Date: Oct. 6, 2016

(87) PCT Pub. No.: WO2015/155285
PCT Pub. Date: Oct. 15, 2015

(65) Prior Publication Data
US 2017/0022330 A1    Jan. 26, 2017

(30) Foreign Application Priority Data
Apr. 10, 2014 (EP) .................................. 14164271

(51) Int. Cl.
*D01D 5/00* (2006.01)
*D01F 6/44* (2006.01)
(Continued)

(52) U.S. Cl.
CPC ............ *C08J 3/07* (2013.01); *B01D 67/0004* (2013.01); *B01D 67/0009* (2013.01);
(Continued)

(58) Field of Classification Search
CPC ........... B01D 2323/08; B01D 2323/39; B01D 2325/38; B01D 67/0004; B01D 67/0009;
(Continued)

(56) References Cited

U.S. PATENT DOCUMENTS

2009/0010870 A1 * 1/2009 Greiner .................. C08F 12/20
424/78.31

FOREIGN PATENT DOCUMENTS

| CN | 102358067 A | 2/2012 |
|---|---|---|
| EP | 2267064 B1 | 2/2006 |
| WO | 2013/092862 A1 | 6/2013 |

OTHER PUBLICATIONS

International Search Report dated Jul. 8, 2015 in PCT/EP2015/057714 (5 pages).
(Continued)

*Primary Examiner* — Alexander M Weddle
(74) *Attorney, Agent, or Firm* — Prismatic Law Group, PLLC

(57) ABSTRACT

The invention concerns a method for producing a superhydrophobic membrane or surface coating of a substrate from an aqueous phase comprising the following steps: a) Preparing an aqueous dispersion by dispersing particles of hydrophobic polymer(s) in an aqueous solution of protic polymer(s), wherein the protic polymer(s) and the hydrophobic polymer(s) are present in a weight ratio of protic polymer(s):hydrophobic polymer(s) in a range of 5:95 to 22:78, b) electrospinning the dispersion of step a) onto a carrier for producing the membrane or onto the surface for producing the surface coating thereby producing at least one fiber and a nonwoven fabric from the fiber, c) subjecting the nonwoven fabric to a sol-gel process, wherein a precursor/precursors of the sol-gel comprise(s) an alkoxysilane, and d)
(Continued)

Figure 1A:
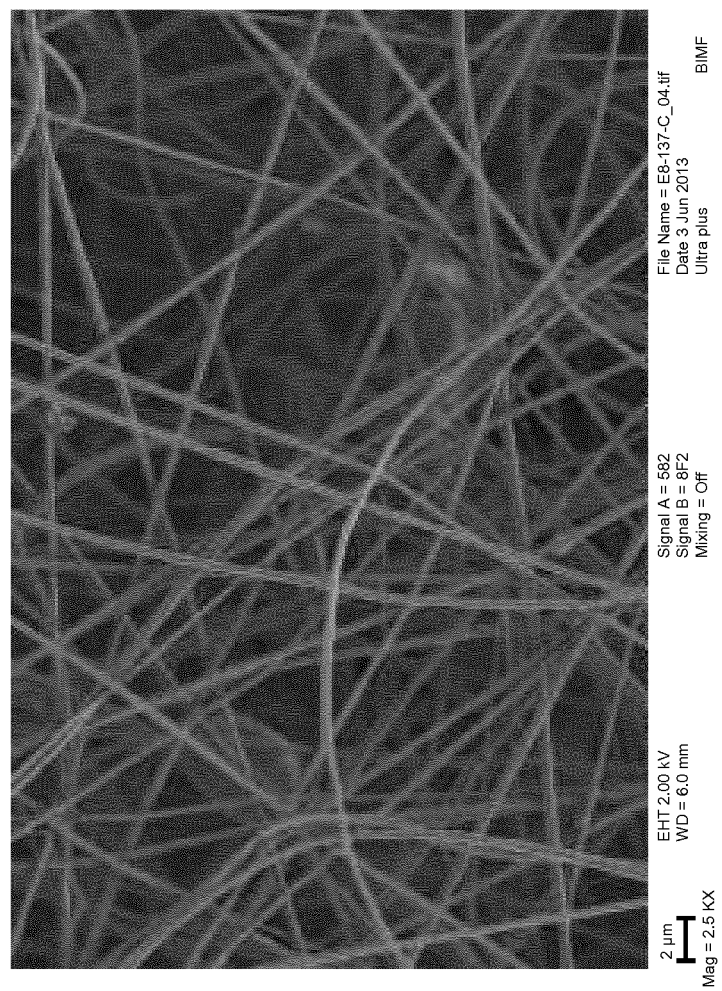

curing the nonwoven fabric obtained by step c) at a temperature in a range of 50° C. to 150° C.

17 Claims, 3 Drawing Sheets

(51) Int. Cl.
  C08J 3/07  (2006.01)
  D06M 13/507  (2006.01)
  D06M 13/513  (2006.01)
  D01F 1/10  (2006.01)
  D01F 6/50  (2006.01)
  B01D 67/00  (2006.01)
  B01D 69/02  (2006.01)
  C09D 133/16  (2006.01)
  C09D 7/65  (2018.01)

(52) U.S. Cl.
  CPC ............... *B01D 69/02* (2013.01); *C09D 7/65* (2018.01); *C09D 133/16* (2013.01); *D01D 5/003* (2013.01); *D01F 1/10* (2013.01); *D01F 6/44* (2013.01); *D01F 6/50* (2013.01); *D06M 13/507* (2013.01); *D06M 13/513* (2013.01); *B01D 2323/08* (2013.01); *B01D 2323/39* (2013.01); *B01D 2325/38* (2013.01); *C08J 2333/16* (2013.01); *C08J 2429/04* (2013.01)

(58) Field of Classification Search
  CPC .......... B01D 69/02; D01D 5/003; D01F 1/10; D01F 6/44; D01F 6/50
  USPC ......................................................... 464/484
  See application file for complete search history.

(56) References Cited

OTHER PUBLICATIONS

Written Opinion dated Jul. 8, 2015 in PCT/EP2015/057714 (6 pages).
Agarwal et al., "Electrospinning of Fluorinated Polymers: Formation of Superhydrophobic Surfaces", Macromol. Mater. Eng., 2006, 291, 592-601.
Database WPI Week 201240 Thomson Scientific, London, GB; AN 2012-C94247 XP002730990, -& CN 102 358 067 A (UNIV JIANGNAN) Feb. 22, 2012 (Feb 22, 2012) abstract.
Gao et al., "Formation of Highly Hydrophobic Surfaces on Cotton and Polyester Fabrics Using Silica Sol Nanoparticles and Nonfluorinated Alkylsilane", Ind. Eng. Chem. Res., 2009, 48(22):9797-9803.
Li et al., "Superhydrophobic surfaces prepared from water glass and non-fluorinated alkylsilane on cotton substrates", Applied Surface Science, 2008, 254(7):2131-2135.
Meng et al., "In-situ growth of titania nanoparticles in electrospun polymer nanofibers at low temperature", Materials Letters, 2009, 63(16):1401-1403.
Satoh et al., "Preparation of Super-Water-Repellent Fluorinated Inorganic-Organic Coating Films on Nylon 66 by the Sol-Gel Method Using Microphase Separation", Journal of Sol-Gel Science and Technology, 2003, 27(3):327-332.
Stoiljkovic et al., "Preparation of water-stable submicron fibers from aqueous latex dispersion of water-insoluble polymers by electrospinning", Polymer, 2007, 48(14):3974-3981.
Wang et al., "Engineering biomimetic superhydrophobic surf aces of electrospun nanomaterials", Nano Today (2011) 6, 510-530.
Xu et al., "Superhydrophobic cotton fabrics prepared by one-step water-based sol-gel coating", The Journal of the Textile Institute, vol. 103, No. 3, Mar. 2012, 311-319.

\* cited by examiner

| Sample | | 1 | 2 | 3 | 4 | 5 |
|---|---|---|---|---|---|---|
| Fiber Composition | HP-53 | 90 | 82.5 | 73 | 50 | |
| | PVA(56-98)(Mw=195k) | 10 | 17.5 | 27 | 50 | 100 |
| Solution | Solvent | water | water | water | water | water |
| | PVA concentration | 3.5% | 4.0% | 5.0% | 6.0% | 7.0% |
| | Total solid content | 34.9% | 22.9% | 18.5% | 12.0% | 7.0% |
| Viscosity / mPa·sec | | 146 | 159 | 227 | 216 | 286 |
| Conductivity / uS/cm | | 6183 | 4140 | 2970 | 1335 | 276 |
| Surface tension / mN/m | | 44 | 46 | 44 | 45 | 62 |
| Result before sol-gel coating | Apearance | | | | | |
| | SEM(2.5k) | | | | | |
| | SEM(20k) | | | | | |
| | SEM(50k) | | | | | |
| | Diameter | 560±139 | 476±142 | 610±192 | 544±214 | 453±171 |
| | Contact Angle for water | | | | | 35° |
| Result after sol-gel coating | Apearance | | | | | |
| | SEM(2.5k) | | | | | |
| | SEM(20k) | | | | | |
| | SEM(50k) | | | | | |
| | Diameter | 750±167 | 817±274 | 810±264 | 777±259 | 817±287 |
| | Contact Angle for water | 160±5.2° | 161±6.0° | 143±3.9° | 140±11.7° | 89±0.5° |
| | Contact Angle for oil | 89±5.2° | 23±5.3° | 25° | 16° | |
| | Roll angle for water | 0° | 0° | 35° | 30° | — |
| | adhesion to aluminium | + (9) | + (5) | | | |
| | adhesion to glass | ++(10) | + (5) | | | |

Fig. 2

METHOD FOR PRODUCING A SUPERHYDROPHOBIC MEMBRANE OR SURFACE COATING OF A SUBSTRATE

CROSS-REFERENCE TO RELATED APPLICATIONS

The present invention is filed under 35 U.S.C. § 371 as the U.S. national phase of International Application No. PCT/EP2015/057714, filed Apr. 9, 2015, which designated the U.S. and claims the benefit of European Patent Application No. 14164271.0, filed Apr. 10, 2014, each of which is hereby incorporated in its entirety including all tables, figures, and claims.

The invention concerns a method for producing a superhydrophobic membrane or surface coating of a substrate, a use of a mixture of substances for the production of a superhydrophobic membrane or surface coating of a substrate, and a mixture of substances. A surface is superhydrophobic if the contact angle of a water droplet on this surface exceeds 150° and in particular 160°. Besides the contact angle hydrophobicity can be further defined by a water-roll angle. For the determination of the water-roll angle a plate is moveably joint to another plate. The sample to be examined is placed on the moveably joint plate. After placing a drop of water on the sample the moveably joint plate supporting the sample is tilted to increasingly steep angles. The angle at which the drop of water rolls down the surface is the water-roll angle. The water-roll angle of a superhydrophobic surface is smaller than 20° and in particular smaller than 10°. A combination of a high contact angle against water and a small water-roll angle on a given membrane or substrate indicates its technical usability as superhydrophobic membrane or substrate.

Known from EP 2 267 064 B1 is a process for preparing a hydrophobic fluorinated polymer surface by use of a homopolymer. In this process a solution of the homopolymer in a solvent selected from the group consisting of tetrahydrofuran, dimethylformamide, trichloromethane and combinations thereof, and preferably in a mixture of tetrahydrofuran and dimethylformamide, is electrospun.

Known from Agarwal, S. et al., Macromol. Mater. Eng. 2006, 291, pages 592-601 is that superhydrophobic surfaces can be formed by electrospinning of copolymers of polystyrene and pentafluorostyrene dissolved in a mixture of the aprotic solvents tetrahydrofuran (THF) and dimethylformamide (DMF). If the copolymers were dissolved in a concentration of 5 and 2 wt.-% particles of 2-3 mm diameter connected by nanofibers were generated. These nanofibers showed a superhydrophobic effect. Fibers generated from the copolymer in a higher concentration had a regular structure and showed a water contact angle of 160° whereas it was not possible to measure the contact angle for the irregular structure because it was not possible to keep a water droplet on it. Therefore, it is assumed that the water contact angle is much more than 160°. It is concluded that electrospinning of fluorinated polymers under suitable conditions to form micro particles interconnected with nanofibers could provide a simple, one-step method for the formation of superhydrophobic surfaces.

Wang, X. et al., Nano Today 2011, 6, pages 510-530 reviews the engineering of biomimetic superhydrophobic surfaces of electrospun nanomaterials. In this article it is concluded that fabricating a surface with superhydrophobicity or superhydrophilicity requires a rough surface structure. However, the surfaces show worse mechanical stability with increasing roughness, which is the main barrier preventing biomimetic superhydrophobic surfaces from application in industry. Known superhydrophobic fibers produced by electrospinning show no interfiber cohesion and no adhesion to substrate surfaces. This results in a bad mechanical stability and a bad abrasion resistance of surface coatings produced from these fibers.

Known from Stoiljkovic A. et al., Polymer 48, 2007, pages 3974-3981 is the preparation of water-stable submicron fibers from aqueous polystyrene latex dispersion of water-insoluble polymers by electrospinning. The dispersion for electrospinning was prepared by mixing of certain amounts of a latex dispersion and polyvinyl alcohol (PVA) in water. The template polymer PVA was removed from electrospun fibers after electrospinning by water extraction. After the removal of the template polymer, the particles hold together due to the attractive van der Waals' forces, which are acting between the particles in the fibers. This results in specific surface structures of the fibers.

The problem to be solved by the present invention is to provide a novel method for producing a novel superhydrophobic material, a use of a mixture of substances for producing this superhydrophobic material and a mixture of substances.

The problem is solved by the features of claims 1, 14 and 15. Embodiments of the invention are disclosed in claims 2 to 13.

According to the invention a method for producing a superhydrophobic membrane or surface coating of a substrate from an aqueous phase is provided. The method comprises the following steps:

a) Preparing an aqueous dispersion by dispersing particles of hydrophobic polymer(s) in an aqueous solution of protic polymer(s), wherein the protic polymer(s) and the hydrophobic polymer(s) are present in a weight ratio of protic polymer(s):hydrophobic polymer(s) in a range of 5:95 to 22:78, b) electrospinning the dispersion of step a) onto a carrier for producing the membrane or onto the surface for producing the surface coating thereby producing at least one fiber and a nonwoven fabric from the fiber, c) subjecting the nonwoven fabric to a sol-gel process, wherein a precursor/precursors of the sol-gel comprise(s) an alkoxysilane, and d) curing the nonwoven fabric obtained by step c) at a temperature in a range of 50° C. to 150° C.

The substrate may be a glass, a metal, a plastic, a textile or a nonwoven, such as a fleece. During the sol-gel process the precursor or the precursors of the sol-gel transform(s) into a colloidal solution (sol) and then into an integrated network (gel). The transformation may occur by hydrolysis upon contact of the precursor(s) with water. Subjecting the nonwoven fabric to the sol-gel process in step c) usually occurs by contacting the nonwoven fabric with the precursor or precursors of the sol-gel during the reaction of the precursor(s) into the sol and the gel. The contacting may be performed by dipping or by coating. The sol-gel process is usually started by contacting or mixing the alkoxysilane with water.

The inventors recognized that known superhydrophobic fibers having a structure of particles connected by fibers, i.e. a structure like a string of pearls, as well as nonwovens consisting of these fibers adhere bad on substrates and are characterized by a bad cohesion of the fibers. Therefore, a practical application of this kind of fibers seems to be difficult.

Surprisingly, it has been found that a nonwoven fabric produced according to the method of the invention is superhydrophobic though the fibers have no structure like a string of pearls. Scanning electron microscope (SEM) micrographs showed that the fibers have a cylindrical form and a porous surface. Furthermore, it has been shown that solely coating the fibers resulting from step b) with alkoxysilanes does not result in a superhydrophobic character of the fibers. The sol-gel process is essential for providing superhydrophobicity. It has been found that the nonwoven fabric produced according to the method of the invention adheres well to substrates. Furthermore, the fibers of the nonwoven fabric produced according to the method of the invention showed cohesion resulting in a high mechanical stability of the fabric. A further feature of the nonwoven fabric produced according to the method of the invention is that the particles are encapsulated and—if the hydrophobic polymer(s) forming the particles are at least partly fluorinated—that no contamination of the surroundings with fluorinated polymer(s) occurs. A particular interesting feature of the membrane or surface coating produced according to the method of the invention is that the membrane or surface coating are self-cleaning upon contact with liquid water.

In the electrospinning processes known from EP 2 267 064 B1 and from Agarwal, S. et al., Macromol. Mater. Eng. 2006, 291, pages 592-601 organic solvents are used. These solvents make the procedures costly because specific materials have to be used for handling the solvents, measures have to be taken to prevent the solvents from taking fire or exploding and after use environmental protection aspects have to be considered.

A main advantage of the method according to the invention is that the dispersion is produced according to step a) by dispersing particles in an aqueous solution of protic polymer(s). By use of water as solvent the disadvantageous accompanying organic solvents are avoided. This makes the production of the superhydrophobic membrane or surface coating of a substrate much cheaper than a production using an organic solvent for the electrospinning process.

The particles of hydrophobic polymer(s) may comprise particles of a polyalkoxysiloxane or of at least one of a polyacrylate, polymethacrylate, polyvinyl ether or polystyrene or a mixture of these particles, wherein each of the polyacrylate, polymethacrylate, polyvinyl ether and the polystyrene comprises an at least partly fluorinated alkyl group or aryl group. The fluorinated alkyl group or aryl group may be perfluorinated. The polymer(s) may be homo- or copolymer(s) or blends of the polymers. It is also possible that a mixture of particles of different polymers is used in step a). The particles may have a grain size in the range of 60 nm to 250 nm.

The polyalkoxysiloxane may comprise linear and/or branched alkyl groups. In one embodiment the alkyl groups are at least partly fluorinated.

In one embodiment the protic polymer(s) comprise(s) at least one of a polyvinyl alcohol (PVA) polyacrylic acid, polymethacrylic acid, chitosan, agarose, polysaccharide, polyethylenimine, methyl cellulose, polyester, polyurea-formaldehyde, polymelamine-formaldehyde, carboxymethyl cellulose, cyclodextrin, polyvinylpyrrolidone, gum arabic, alginate, starch, gelatine, casein, poly glycidyl methacrylate, and polyanhydride. The protic polymer(s) may be homopolymer(s) or copolymer(s).

The protic polymer may be PVA and/or the hydrophobic polymer may be poly((1H, 1H, 2H, 2H) perfluorodecyl acrylate) (=FD). The protic polymer(s) and the hydrophobic polymer(s) may be present in a weight ratio of protic polymer(s):hydrophobic polymer(s) in a range of 8:92 to 20:80, in particular 9:91 to 14:86. If it is in the range of 5:95 to 14:86 it has been found that the surface is not only superhydrophobic but also oliphobic. Depending on the weight ratio of protic polymer(s):hydrophobic polymer(s) surfaces with different functionalities can be obtained.

An alkyl group/alkyl groups of the alkoxysilane may be at least partly fluorinated. The alkoxysilane may comprise at least one methoxy group and/or at least one linear or branched alkyl group comprising 5 to 30 carbon atoms.

In one embodiment the precursor(s) comprise(s) tetraethylorthosilicate (TEOS). Alternatively or in addition the precursor(s) may comprise n-decyl trimethoxysilane (DTMS). The TEOS and/or the DTMS may be present in an alcoholic acidic solution. TEOS and DTMS may be present as precursors in a molar ratio of TEOS:DTMS in a range of 0.3:0.06 to 1.0:0.5. For example, the molar ratio of TEOS:DTMS:ethanol:HCl may be 0.5:0.1:28.9:0.008.

The substrate may comprise a textile or a nonwoven, such as a fleece, a filter, a glass, a plastic, a ceramic, a paper, or a metal. Each of the textile and the nonwoven may comprise natural and/or artificial fibers. The substrate may be an object of utility.

In one embodiment of the method according to the invention the nonwoven fabric is cured at a temperature in the range of 70° C. to 90° C. The curing may be performed for a period in a range of 1 minutes to 60 minutes, preferably 5 minutes to 15 minutes.

It has been recognized that relative humidity during electrospinning influences the geometry of the resulting fiber. Relative humidity during step b) may be lower than 30%, in particular lower than 20%.

The invention further concerns the use of a dispersion comprising particles of hydrophobic polymer(s) in an aqueous solution of protic polymer(s), wherein the protic polymer(s) and the hydrophobic polymer(s) are present in a weight ratio of protic polymer(s):hydrophobic polymer(s) in a range of 5:95 to 22:78 for the production of a superhydrophobic membrane or surface coating of a substrate. The superhydrophobic surface coating of a substrate can be used to provide the surface of the substrate with a self-cleaning ability. Such a feature is particularly useful for surfaces that are usually located outdoor and thereby become polluted by particles such as soot particles. Such a surface can then be cleaned by raindrops running down the surface which raindrops collect the particles from the surface.

The particles of the hydrophobic polymer(s) may comprise particles of a polyalkoxysiloxane or of at least one of a polyacrylate, polymethacrylate, polyvinyl ether or polystyrene or a mixture of these particles, wherein each of the polyacrylate, polymethacrylate, polyvinyl ether and the polystyrene comprises an at least partly fluorinated alkyl group or aryl group. The polyalkoxysiloxane may comprise linear and/or branched alkyl groups. The alkyl groups may be at least partly fluorinated. The particles may have a grain size in the range of 60 nm to 250 nm. The protic polymer(s) may comprise at least one of a polyvinyl alcohol (PVA), polyacrylic acid, polymethacrylic acid, chitosan, agarose, polysaccharide, polyethylenimine, methyl cellulose, polyester, polyurea-formaldehyde, polymelamine-formaldehyde, carboxymethyl cellulose, cyclodextrin, polyvinylpyrrolidone, gum arabic, alginate, starch, gelatine, casein, poly glycidyl methacrylate, and polyanhydride. The protic polymer may be PVA and/or the hydrophobic polymer may be poly((1H, 1H, 2H, 2H) perfluorodecyl acrylate) (=FD). The protic polymer(s) and the hydrophobic polymer(s) may be present in a weight ratio of protic polymer(s):hydrophobic polymer(s) in a range of 8:92 to 20:80, in particular 9:91 to 14:86.

The invention further concerns a dispersion comprising particles of hydrophobic polymer(s) in an aqueous solution of protic polymer(s), wherein the protic polymer(s) and the hydrophobic polymer(s) are present in a weight ratio of protic polymer(s):hydrophobic polymer(s) in a range of 5:95 to 22:78, wherein the particles of hydrophobic polymer(s) comprise particles of a polyalkoxysiloxane or of at least one of a polyacrylate, polymethacrylate, or polyvinyl ether or a mixture of these particles, wherein each of the polyacrylate, polymethacrylate, and polyvinyl ether comprises an at least partly fluorinated alkyl group or aryl group. The at least partly fluorinated alkyl group or aryl group may be perfluorinated.

EMBODIMENTS OF THE INVENTION

Figure 1B:
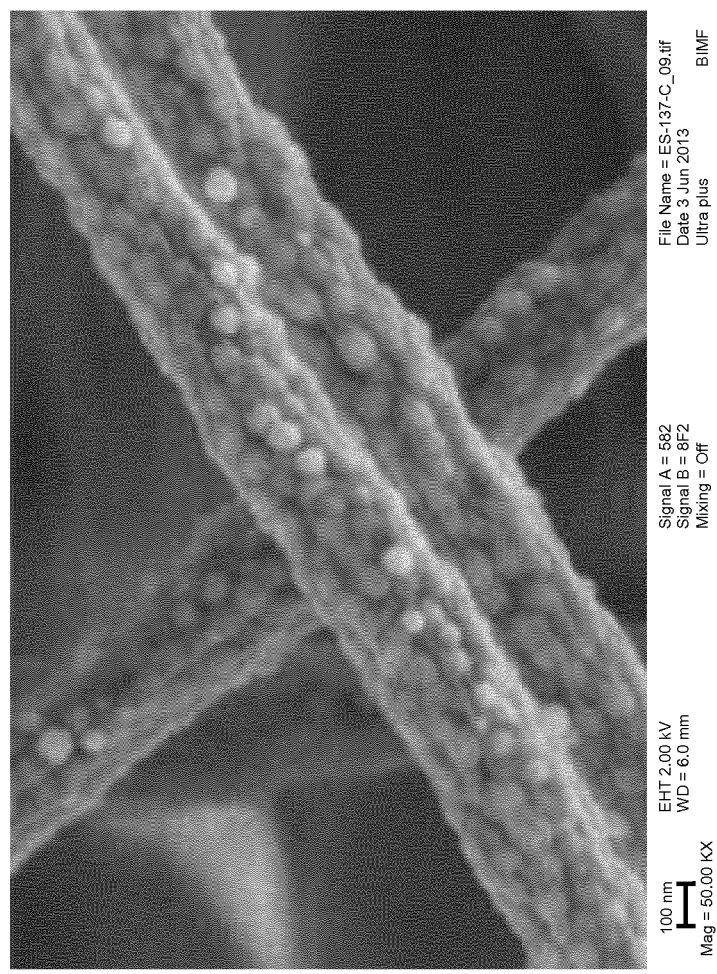

FIGS. 1a and 1b SEM micrographs of electrospun PVA (17%)-FD (83%) composite fibers at different magnifications.

FIG. 2 shows a table comparing the features of different nonwovens produced from different compositions of PVA-FD by the method according to the invention comprising a sol-gel process with TEOS and DTMS and before the sol-gel process.

15 wt.-% PVA aqueous solution was mixed with an aqueous dispersion of poly((1H, 1H, 2H, 2H) perfluorodecyl acrylate) (=FD), average particle grain size=110 nm (measured by dynamic light scattering) at several solid ratios. Electrospinning with a standard one-needle set-up was carried out at 23° C. and 14% relative humidity. The solutions were filled in a 2.5 ml syringe attached with a blunt steel needle of 1.2 mm inner diameter. A rotating round steel plate (diameter=15 cm) as counter electrode was placed 11 cm away from the needle tip. The positive power supply was attached to the needle and the negative power supply was attached to the counter electrode. The voltage was applied at 30 kV, and electrospun fiber mats were deposited on aluminum, cotton, glass or paper attached on steel plate.

The nonwoven fabrics were subjected to the sol-gel process to modify surface property. For this purpose a sol-gel solution with a molar ratio of orthosilicate (TEOS): n-decyl trimethoxysilane (DTMS):ethanol:HCl being 0.5: 0.1:28.9:0.008 was prepared along with strong stirring at room temperature for 30 min. The nonwoven fabrics were immersed into the sol-gel solution for 5 seconds and then cured in an oven for 10 min.

The electrospun fibers showed a cylindrical structure (FIG. 1a). At higher magnification the dispersion particles embedded in the PVA matrix can be identified (FIG. 1b).

The results obtained with different PVA-FD compositions are given in FIG. 2. HP-53 is a preparation of FD having a grain size of about 100 nm. HP-53 is dispersed in an aqueous solution of PVA in ratios of PVA:FD of 10:90 (sample 1), 17.5:82.5 (sample 2), 27:73 (sample 3) and 50:50 (sample 4). It can be clearly seen that all compositions show contact angles against water <50° before sol-gel treatment. However, after sol-gel treatment with TEOS/DTMS the different compositions show significantly different behavior. The sol-gel treated electrospun nonwovens prepared with a composition of PVA:FD of 10:90 (sample 1) and 17.5:82.5 (sample 2) showed superhydrophobic behavior. Sol-gel treated electrospun nonwovens with compositions of PVA:FD of 27:73 (sample 3) and 50:50 (sample 4) showed no superhydrophobic behavior which is very remarkable as with higher content of fluorinated compound lower contact angles were found. In contrast, sol-gel treated pure PVA fibers showed a contact angle of 89° (sample 5). Indeed, there is a window of compositions for PVA:FD which provides after sol-gel treatment superhydrophobicity of the nonwovens. It is obvious from the SEM micrographs, that the superhydrophobic fibers show high porosity after sol-gel treatment (FIG. 2). Interestingly, for sample 1 next to superhydrophobicity oleophobic behavior was found whereas sample 2 showed also superhydrophobicity but not oleophobic behavior. This means, that depending on the composition of PVA:FD samples with different functionality can be obtained. Sample 2 has double function in terms of water repellence and water/oil separation whereas as sample 1 has double function in terms of water and oil repellence. A tape test showed for samples 1 and 2 very good adhesions to glass and metal (Al) surfaces.

The invention claimed is:

1. Method for producing a superhydrophobic membrane or surface coating of a substrate from an aqueous phase comprising the following steps:
    a) Preparing an aqueous dispersion by dispersing particles of hydrophobic polymer(s) in an aqueous solution of protic polymer(s), wherein the protic polymer(s) and the hydrophobic polymer(s) are present in a weight ratio of protic polymer(s):hydrophobic polymer(s) in a range of 5:95 to 22:78,
    b) electrospinning the dispersion of step a) onto a carrier for producing the membrane or onto the surface for producing the surface coating thereby producing at least one fiber and a nonwoven fabric from the fiber,
    c) subjecting the nonwoven fabric to a sol-gel process, wherein a precursor/precursors of the sol-gel comprise(s) an alkoxysilane, and
    d) curing the nonwoven fabric obtained by step c) at a temperature in a range of 50° C. to 150° C.

2. Method according to claim 1, wherein the particles of hydrophobic polymer(s) comprise particles of a polyalkoxysiloxane or of at least one of a polyacrylate, polymethacrylate, polyvinyl ether or polystyrene or a mixture of these particles, wherein each of the polyacrylate, polymethacrylate, polyvinyl ether and the polystyrene comprises an at least partly fluorinated alkyl group or aryl group.

3. Method according to claim 2, wherein the polyalkoxysiloxane comprises linear and/or branched alkyl groups.

4. Method according to claim 3, wherein the alkyl groups are at least partly fluorinated.

5. Method according to claim 1, wherein the particles have a grain size in the range of 60 nm to 250 nm.

6. Method according to claim 1, wherein the protic polymer(s) comprise(s) at least one of a polyvinyl alcohol (PVA), polyacrylic acid, polymethacrylic acid, chitosan, agarose, polysaccharide, polyethylenimine, methyl cellulose, polyester, polyurea-formaldehyde, polymelamine-formaldehyde, carboxymethyl cellulose, cyclodextrin, polyvinylpyrrolidone, gum arabic, alginate, starch, gelatine, casein, poly glycidyl methacrylate, and polyanhydride.

7. Method according to claim 1, wherein the protic polymer is PVA and/or the hydrophobic polymer is poly (1H,1H,2H,2H-perfluorodecyl acrylate).

8. Method according to claim 7, wherein the protic polymer(s) and the hydrophobic polymer(s) are present in a weight ratio of protic polymer(s):hydrophobic polymer(s) in a range of 8:92 to 20:80.

9. Method according to claim 8, wherein the protic polymer(s) and the hydrophobic polymer(s) are present in a weight ratio of protic polymer(s):hydrophobic polymer(s) in a range of 9:91 to 14:86.

10. Method according to claim 1, wherein an alkyl group/alkyl groups of the alkoxysilane is/are at least partly fluorinated.

11. Method according to claim 1, wherein the alkoxysilane comprises at least one methoxy group and/or at least one linear or branched alkyl group comprising 5 to 30 carbon atoms.

12. Method according to claim 1, wherein the precursor(s) comprise(s) tetraethylorthosilicate (TEOS).

13. Method according to claim 12, wherein the precursor(s) comprise(s) tetraethylorthosilicate (TEOS) in an alcoholic acidic solution.

14. Method according to claim 1, wherein the precursor(s) comprise(s) n-decyl trimethoxysilane (DTMS).

15. Method according to claim 14, wherein the precursor(s) comprise(s) n-decyl trimethoxysilane (DTMS) in an alcoholic acidic solution.

16. Method according to claim 14, wherein TEOS and DTMS are present as precursors in a molar ratio of TEOS:DTMS in a range of 0.3:0.06 to 1.0:0.5.

17. Dispersion comprising particles of hydrophobic polymer(s) in an aqueous solution of protic polymer(s), wherein the protic polymer(s) and the hydrophobic polymer(s) are present in a weight ratio of protic polymer(s):hydrophobic polymer(s) in a range of 5:95 to 22:78, wherein the particles of hydrophobic polymer(s) comprise particles of a polyalkoxysiloxane or of at least one of a polyacrylate, polymethacrylate, or polyvinyl ether or a mixture of these particles, wherein each of the polyacrylate, polymethacrylate, and polyvinyl ether comprises an at least partly fluorinated alkyl group or aryl group.

* * * * *